No. 733,479. PATENTED JULY 14, 1903.
J. S. HAMILTON.
FRUIT PICKER.
APPLICATION FILED JAN. 19, 1903.
NO MODEL.
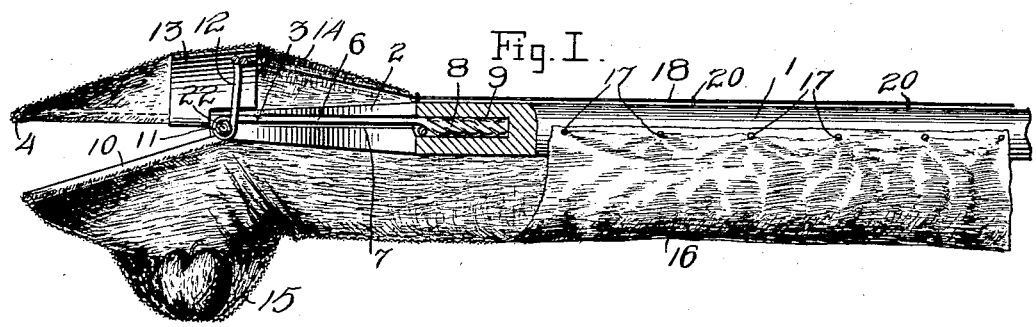
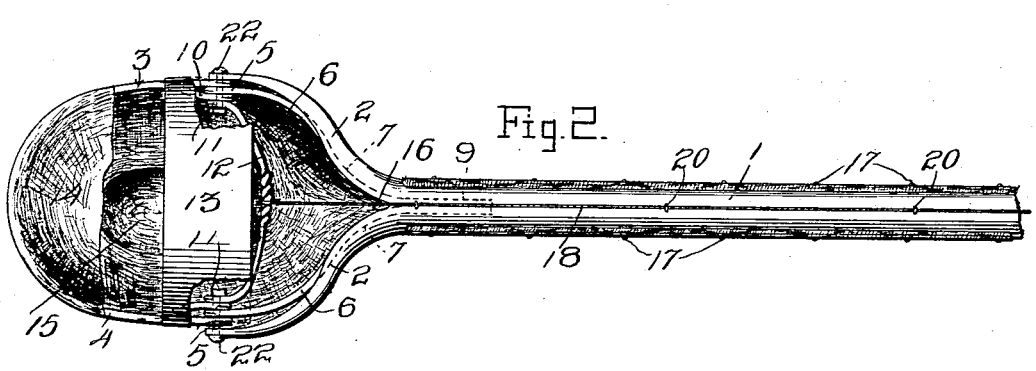
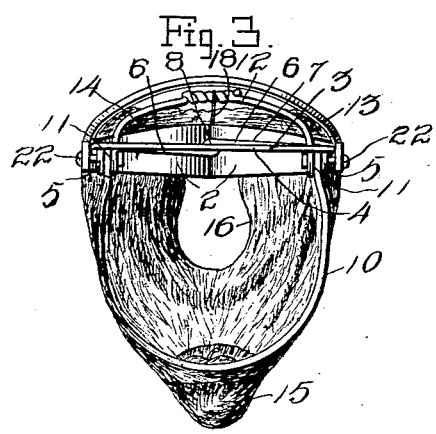
Witnesses
C. A. Reichenbach.
L. Heiton
Inventor.
J. S. Hamilton.
By H. B. Willson & Co.
Attorneys No. 733,479.

Patented July 14, 1903.

UNITED STATES PATENT OFFICE.

JOHN SAMUEL HAMILTON, OF KYANA, INDIANA.

FRUIT-PICKER.

SPECIFICATION forming part of Letters Patent No. 733,479, dated July 14, 1903.

Application filed January 19, 1903. Serial No. 139,663. (No model.)

*To all whom it may concern:*

Be it known that I, JOHN SAMUEL HAMILTON, a citizen of the United States, residing at Kyana, in the county of Dubois and State of Indiana, have invented certain new and useful Improvements in Fruit-Pickers; and I do declare the following to be a full, clear, and exact description of the invention, such as will enable others skilled in the art to which it appertains to make and use the same.

My invention is an improved fruit-picker; and it consists in the peculiar construction and combination of devices hereinafter fully described and claimed.

The object of my invention is to provide a cheap, simple, efficient, and entirely practical device of this character which is operative to rapidly pick fruit from trees without injury to the fruit and to conduct it without injury thereto to a suitable receptacle, as a basket or the like, on the ground.

In the accompanying drawings, Figure 1 is a side elevation, partly in section, of a fruit-picker embodying my improvements. Fig. 2 is a top plan view of the same with a portion of the cloth covering of the head or upper jaw removed to show the fork at the upper end of the pole and the connection of the upper-jaw frame with the pole, also showing the pivotal connections between the upper and lower jaws. Fig. 3 is an end elevation of the same with the lower jaw open and a portion of the covering of the head or upper jaw removed.

In the embodiment of my invention I provide a pole 1, of suitable length and of any suitable construction and material, the same having its upper end forked to provide the outwardly-diverging arms 2.

The frame 3 of the upper jaw or head is preferably made of a single piece of wire bent at its central portion in substantially semicircular form, as at 4, provided with pivotal eyes 5, inwardly-converging arms 6, adapted to lie in grooves 7 in the opposing sides of the fork-arms of the pole, and the ends of the said converging arms being united and twisted together to form a stem 8, which is inserted in a recess 9, bored in the outer end of the pole.

The lower jaw 10, which is of substantially semicircular form, is also formed of a single piece of wire bent to form pivotal eyes 11 to coincide with the eyes 5 of the upper-jaw frame. Also formed with the lower jaw is an upwardly and rearwardly extending lever 12, formed by uniting the ends of the wire together. This lever 12 is placed above the upper-jaw frame, and the latter is provided with a transversely-disposed stiffening-bar 13, which may in practice be made of sheet metal, the ends of which are bent to embrace the sides of the upper-jaw frame at the pivotal portion thereof. The function of this stiffening-bar is to support the fabric 14, which is stretched over and connected to the upper-jaw frame, as shown. The rear portion of the said covering fabric is secured to the pole, and the front side thereof is hemmed or bound around the curved front portion of the upper-jaw frame, so that it covers the same and forms the cushion therefor to prevent the upper-jaw frame from bruising and injuring the fruit. The covering fabric 14 is held by the stiffening band or bar 13 in an elevated position at its center to clear the lever which operates the lower jaw.

To the lower jaw is secured a depending pouch 15, made of suitable fabric, the front portion thereof being bound around or hemmed on the curved lower-jaw frame to cover and cushion the latter and prevent the same from injuring the fruit, and the pouch communicates at its throat or inner side with a conducting-tube 16, which is also made of suitable fabric, such as cotton or other cloth of suitable length and breadth, the upper sides of the said fabric being secured to opposite sides of the pole, as by suitable tacks 17 or other devices. The said tube 16 is of suitable length to lead to and discharge into a basket or other vessel on the ground.

Where the pole is made of separable sections similar to a fishing-rod, the delivery-tube 16 may be also made of sections each carried by one section of the pole, so that when the latter is jointed the various sections of the delivery-tube communicate with each other. I do not limit myself in these particulars. It will be observed that the construction of the pouch 15, which is carried by the lower jaw, is such that the same is adapted to hold one or more apples, peaches, or other fruits, so that the weight of the fruit will be efficient in opening the lower jaw, thus enabling me to dispense with the use of a spring for this purpose. The operating-cord 18 is connected to the lever with which the lower jaw is provided, and the said operating-cord is of suitable length and is guided along the pole by any suitable means, staples 20 being here shown for this purpose.

Any suitable means may be employed for pivotally connecting the lower and upper jaws together. In the embodiment of my invention here shown pivot-bolts 22 are employed for this purpose; but I do not limit myself in this particular.

It will be observed by reference to the drawings and understood from the foregoing description that the lever which operates the lower jaw is disposed entirely within the head or fabric stretched over and carried by the upper jaw, so that the said lever is effectually shielded and cannot possibly come in contact with twigs or branches and become fouled when the fruit-picker is in operation. It will be further understood that by providing the upper end of the pole with the forked arms and by providing the upper-jaw frame with arms which bear against the inner sides of and are secured to the said forked arms and by further providing the upper-jaw frame with the stem which is socketed in the bore at the upper end of the pole an exceedingly strong connection is made between the upper-jaw frame and the pole, and hence the durability of the fruit-picker is very materially enhanced. It will be further understood that when the jaws are closed together on the stem of an apple, pear, peach, or other fruit to inclose the same between the head fabric 14 and the fabric carried by the lower jaw the stem is not cut by the said jaws or either of them and the fruit is picked by an appropriate movement communicated to the fruit-picker by the operator thereof, so that the fruit is caused to be severed from the tree without injury thereto, as it comes in contact only with the cushioned front portions of the upper and lower jaws. By providing the lower jaw with a tube to retain one or more fruits, and thereby utilize the latter as means for opening the lower jaw by gravity, I am enabled, as hereinbefore stated, to dispense with a spring for this purpose, thus not only effecting an economy of the construction of the fruit-picker, but also materially increasing its efficiency and durability, as springs are always somewhat unreliable in operation and their resilient properties necessarily become impaired by age and rust.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. A fruit-picker having a fixed head provided at a point intermediate its ends with a stiff shield and a flexible fabric covering having its central portion stretched over said shield and its edges attached to the said head, and a pivoted jaw having a lever disposed within and under said shield and prevented thereby from coming in contact with twigs or branches when the fruit-picker is in use, substantially as described.

2. In a fruit-picker, the combination of a pole having fork-arms at its upper end, and a jaw frame or head having converging portions to bear against the fork-arms, and a projecting stem to effect a connection between said jaw or head frame and the pole, substantially as described.

3. In a fruit-picker, the combination of a pole having fork-arms, and a bore 9 at its upper end with a head or jaw frame having converging portions 6 to bear against the inner sides of the fork-arms, means to connect said portions 6 to the fork-arms, and a projecting stem 8 to enter the bore of the pole, substantially as described.

4. A fruit-picker having a pivoted lower jaw, and a conducting-tube, the receiving end of which tube is flexible and connected to the pivoted lower jaw, and a pouch under said lower jaw in advance of the pivotal connection of the lower jaw and depending from and communicating with the flexible receiving portion of said conducting-tube to receive and retain an object adapted by its weight to normally open said lower jaw, substantially as described.

In testimony whereof I have hereunto set my hand in presence of two subscribing witnesses.

JOHN SAMUEL HAMILTON.

Witnesses:
H. C. WILLIAMS,
M. W. OLDER.